United States Patent
Harvey

[15] 3,649,113
[45] Mar. 14, 1972

[54] PROJECTOR MECHANISM FOR MAINTAINING THE FILM AREA PROJECTED ON A SCREEN PREFERABLY IN FOCUS AND OF A PREDETERMINED SIZE

[72] Inventor: Donald M. Harvey, Webster, N.Y.
[73] Assignee: Eastman Kodak Company, Rochester, N.Y.
[22] Filed: Dec. 4, 1969
[21] Appl. No.: 882,173

[52] U.S. Cl. ............................................. 353/101, 355/56
[51] Int. Cl. ......................................................... G03b 3/10
[58] Field of Search ............. 353/104, 101, 69, 68; 352/140; 95/45, 44; 355/44, 55, 56, 57–59; 350/41, 46, 76, 77

[56] References Cited

UNITED STATES PATENTS

| 2,679,189 | 5/1954 | Burns | 352/140 X |
| 2,747,456 | 5/1956 | Waller et al. | 353/101 X |
| 3,532,045 | 10/1970 | Genahr | 95/45 |

FOREIGN PATENTS OR APPLICATIONS

| 384,892 | 2/1965 | Switzerland | 353/101 |

*Primary Examiner*—Harry N. Haroian
*Attorney*—Robert W. Hampton and Steve W. Gremban

[57] ABSTRACT

A projector having mechanism including a zoom lens for automatically maintaining the projected film area visible on a viewing plane such as a screen or the like preferably in focus and of a predetermined size regardless of the size of the illumination transmitting area of the film positioned at the projection station. A sensing mechanism senses the size of the illumination transmitting area of the film at the projection station, and produces a signal output corresponding thereto for controlling an adjusting mechanism for automatically adjusting the zoom lens to maintain the projected film area visible on the screen preferably in focus and of a predetermined size.

9 Claims, 6 Drawing Figures

Patented March 14, 1972

DONALD M. HARVEY
INVENTOR.

BY Steve W. Grambow
Robert W. Hampton
ATTORNEYS

Patented March 14, 1972
3,649,113
3 Sheets-Sheet 2
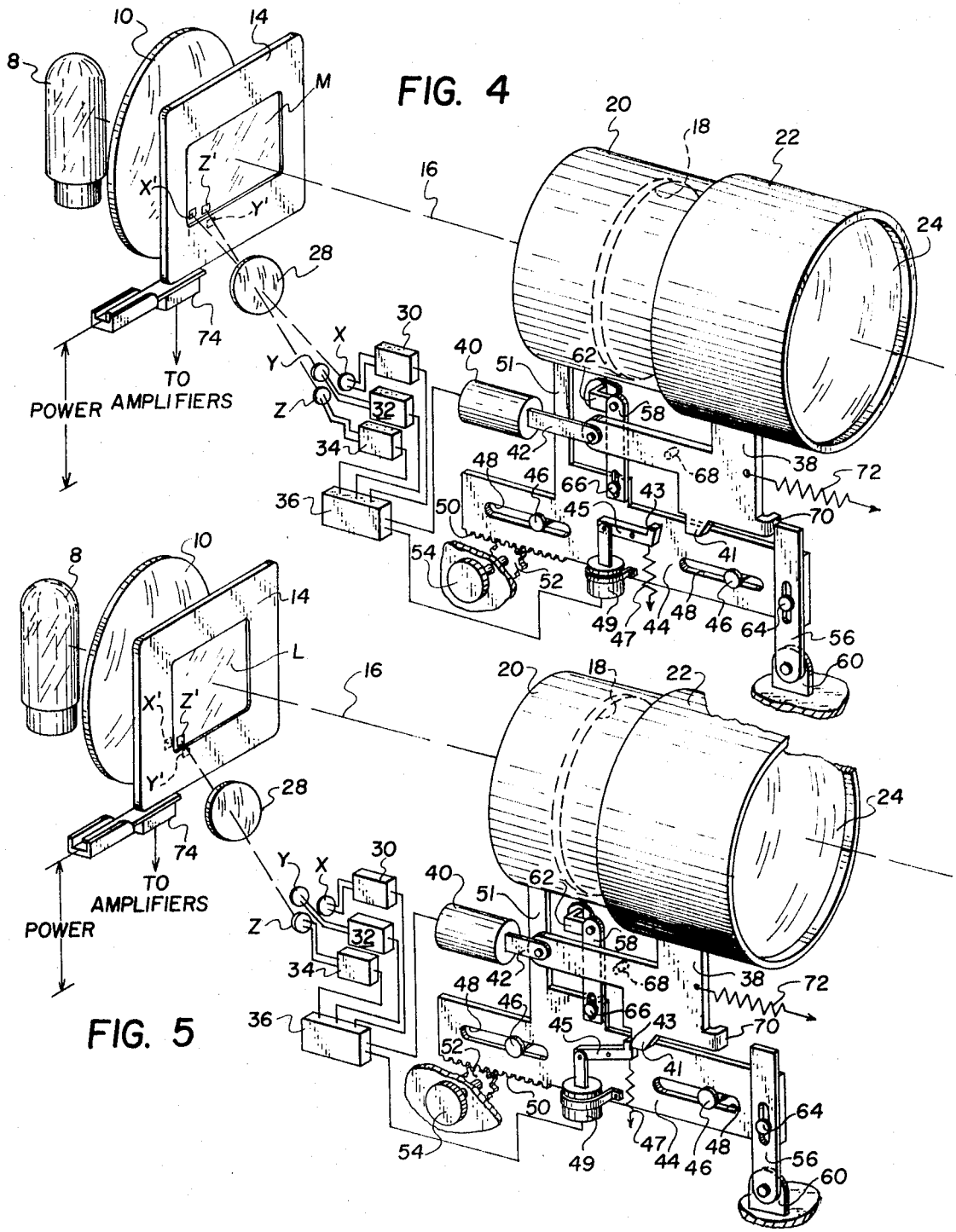
DONALD M. HARVEY
INVENTOR.
BY Steve W. Grambau
Robert W Hampton
ATTORNEYS Patented March 14, 1972

DONALD M. HARVEY
INVENTOR.

BY
ATTORNEYS 3,649,113

PROJECTOR MECHANISM FOR MAINTAINING THE FILM AREA PROJECTED ON A SCREEN PREFERABLY IN FOCUS AND OF A PREDETERMINED SIZE

BACKGROUND OF THE INVENTION

1. Field of the Invention

This invention relates generally to projectors, and more specifically to a projector mechanism for automatically maintaining the projected film area visible on a viewing plane preferably in focus and of a predetermined size for illumination transmitting areas of film of varying size at the projection station.

2. Description of the Prior Art

In photographic projectors for projecting a film image at a viewing plane such as a screen or the like, if the size of the illumination transmitting area of the film at the projection station should increase or decrease, the size of the projected film area visible on the screen will also increase or decrease respectively. In slide presentations in which the illumination transmitting areas of the film mounts at the projection station vary, the visible film area at the viewing plane will vary, which if uncorrected is distracting to the viewing audience. For example, if the film image on a 35 mm. film mount having an illumination transmitting area of a predetermined size is projected, the projected film area visible on the screen located a fixed distance from the projector will be a predetermined size. Now, if a slide mount is positioned at the projection station having an illumination transmitting area that is smaller than the illumination transmitting area for the 35 mm. slide mount, the projected visible area at the viewing screen would likewise be smaller. Accordingly, it would be desirable to increase this smaller visible viewing area on the screen to the predetermined size thereby increasing the magnification of the image being projected, and producing a less distracting presentation to the viewers. Correction has heretofore necessitated physically moving the projector to a new location closer to or further away from the screen, and refocusing the projected film area to increase or decrease the visible area at the viewing screen each time the size of the illumination transmitting area of film at the projection station varies or changes. Such correction is extremely time consuming and distracting to the viewers.

SUMMARY OF THE INVENTION

This invention includes within its scope a projector having a film gate for successively supporting film or film mounts having illumination transmitting areas of varying sizes. The projector has a projection system including a zoom lens for projecting the film area on a screen, and sensing means for sensing the size of the illumination transmitting area of the film at the film gate and producing a signal in accordance with the size of the area. A logic circuit is responsive to the signal for operating an adjusting mechanism for the projection lens for adjusting the position of the zoom lens along the optic axis to maintain the projected visible area at the viewing screen preferably in focus and of a predetermined size.

It is an object of the present invention to provide a projector having means for automatically maintaining the projected film area visible on a viewing screen preferably in focus and of substantially the same size regardless of the size of the illumination transmitting area of the film at the projection station.

Another object of the invention is to provide a projector having means for sensing the size of the illumination transmitting area of the film being projected and producing a corresponding signal, and zoom lens adjusting means responsive to the signal from the sensing means for adjusting the position of the zoom lens along the optic axis for maintaining the projected film area visible on the screen preferably in focus and of a predetermined size.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 4 is a schematic view in perspective showing the mechanism for adjusting the projecting system of the projector, the mechanism being in a position to maintain the projected film area visible at the viewing screen of a film of normal predetermined size preferably in focus and of a predetermined size;

FIG. 5 is a view similar to FIG. 4 showing the mechanism in a position to maintain the visible projected film area of a film of different size preferably in focus and of said predetermined size.

DESCRIPTION OF THE PREFERRED EMBODIMENT

Because projectors are well known, the present description will be directed in particular to elements forming part of or cooperating more directly with the present invention, projector elements not specifically shown or described herein being understood to be selectable from those known in the art.

Figure 2:
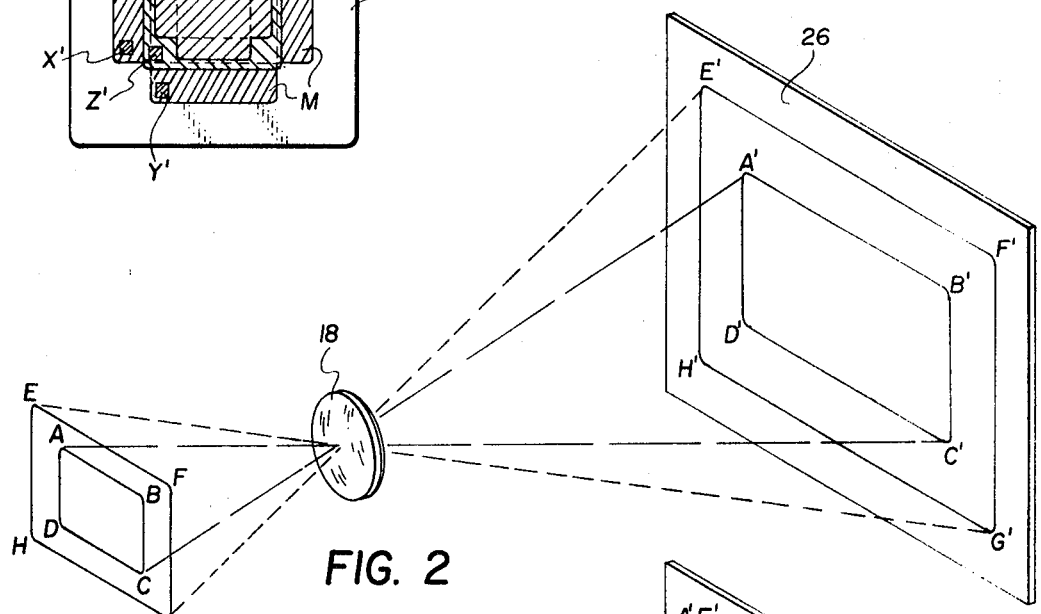
FIG. 2 is a schematic showing in perspective of two illumination transmitting areas of film of different size which are projected by a fixed lens on a viewing screen to provide two visible projected areas of different size.
Figure 3:
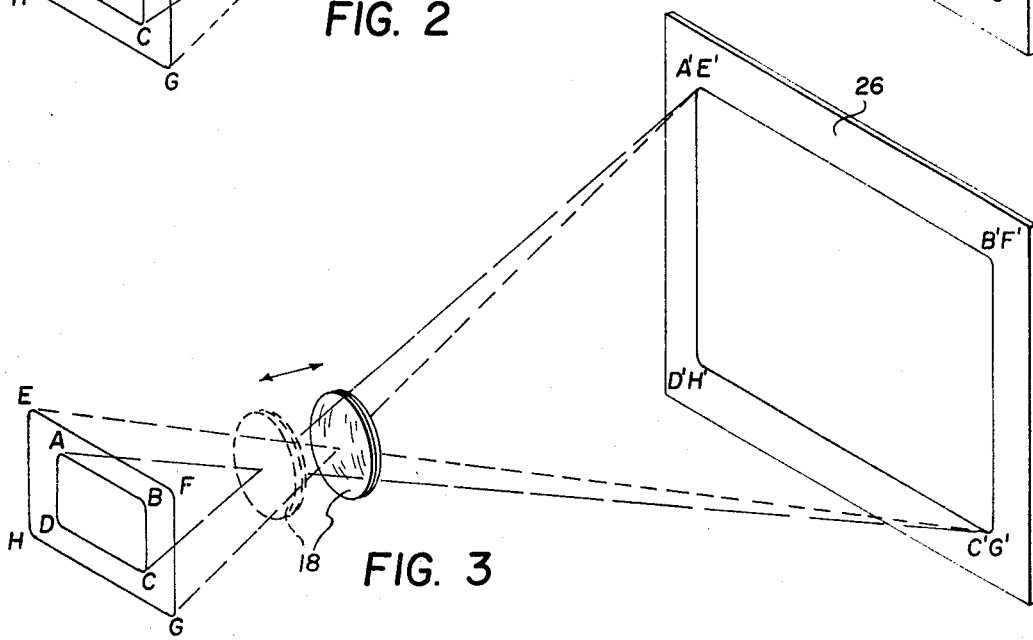
FIG. 3 is a view similar to FIG. 2 showing illumination transmitting areas of film of different size, and further showing a lens in schematic form for projecting the film areas on a viewing screen preferably in focus and of a fixed size.
Figure 6:
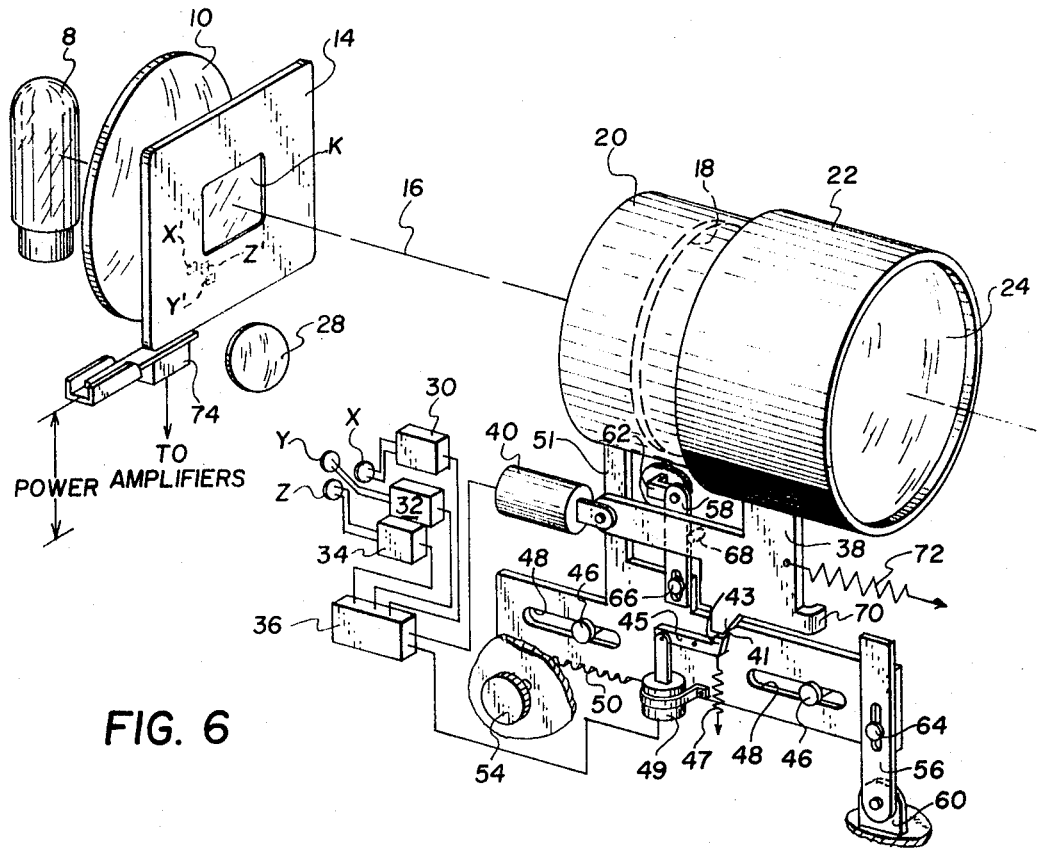
FIG. 6 is a view similar to FIG. 5 showing the mechanism in still another position.

This invention as best seen in FIGS. 4-6 is shown embodied in a projector such as a slide projector having an optical system in which light from a light source 8 is collected by a condenser lens 10 and concentrated on the illumination transmitting areas of varying size of films L, M and K shown supported by a suitable film mount 14. The film mount is held in any known film or projection gate mechanism, not shown, with the film centered on an optic axis 16 established by an objective lens 18 mounted in a barrel 20, and which in combination with a movable auxiliary zoom lens barrel 22 and lens 24 projects the film image onto a viewing plane such as a screen 26. As seen in FIG. 2, if a film has an illumination transmitting area designated A, B, C, D, the projected film area visible on viewing screen 26 would have an area or size designated A', B', C', and D'. If a different film mount having an illumination transmitting area designated E, F, G, H is placed in the projection gate at the same screen-to-lens distance, the projected film area visible on screen 26 would have an area or size designated E', F', G', H'. It is normally desirable for the convenience of the spectators to have the projected film area visible on the screen of maximum size, and of substantially the same size as seen in FIG. 3 for illumination transmitting areas of varying size at the projection station.

Figure 1:
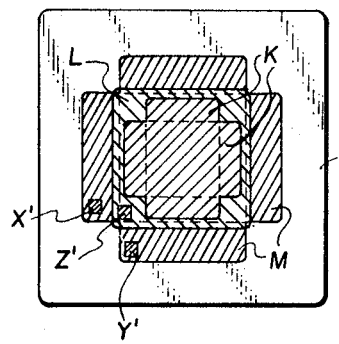
FIG. 1 is a front elevational view of a film mount of a standard outer dimension shown with apertures of varying size capable of holding films having illumination transmitting areas of different formats or sizes.

A sensing mechanism is provided for sensing the illumination transmitting area of the film to be projected. The sensing is accomplished by a plurality of radiation sensing means such as photoelectric or photocells designated X, Y, and Z as seen in FIGS. 4-6 for sensing radiation from the illuminating means 8 passing through the illumination transmitting area of the film in a film mount 14. The radiation passing through portions designated X', Y' and Z' of the film are collected by a lens 28 (see FIGS. 4-6) and focused on one or more of the photocells. For example, if a film mount 14 has a horizontally or vertically oriented illumination transmitting area designated M, as best seen in FIGS. 1 and 4, two of the photocells X and Z or Y and Z respectively would be actuated by the radiation passing through portions X' and Z' or Y' and Z' of film M. If a film mount 14 is mounted in the film gate having the substantially square illumination transmitting area designated L as seen in FIGS. 1 and 5, the radiation to photocells X and Y would be blocked by the opaque film mount material whereas photocell Z would be activated by the radiation passing through the portion designated Z' of film L. Now if a film mount 14 such as seen in FIG. 1 having a vertically or horizontally oriented illumination transmitting area K is inserted in the projection gate as seen in FIGS. 1 and 6, all of the radiation from illumination means 8 would be blocked by the opaque film mount material and none of the photocells X, Y and Z would be actuated.

The photocells X, Y and Z are normally electrically connected to amplifier 30, 32 and 34 and the amplifier output supplied through any suitable commercially available logic circuit 36 to an adjusting mechanism to be described hereinafter. The logic circuit may be of the type having a circuit which will transmit no signal from its output if a signal is present at two inputs, or a circuit which will transmit a signal whenever no input signal is present or a signal is present at one of the inputs. The logic circuit may be any suitably designed circuit for operating the adjusting mechanism in a predetermined way depending upon the input thereto from the photocells and amplifiers. The amplifiers 30, 32, 34 may be any suitable amplifying circuits and the photocells X, Y, and Z may be photoresistive devices whose impedience varies with the amount of illumination impinging upon the cells. When sufficient radiation is sensed by each photocell, current will flow in a portion of the amplifier which is capable of feeding a signal to the input of the logic circuit.

The adjusting mechanism comprises a flange 38 secured to and depending from the objective zoom lens barrel 22. The flange 38 and barrel 22 are guided for axial movement along the optic axis 16 by any known means, not shown. A solenoid 40 has its reciprocally movable armature 42 secured to flange 38, and is energized by a signal or current flow produced when photocell Z alone is subjected to radiation or when none of the photocells X, Y and Z is subjected to radiation. Flange 38 has a lug 41 for engaging a lip 43 at one end of a pivotally mounted pawl 45. Pawl 45 is pivoted by spring 47 into a normal position in which lip 43 is out of the path of lug 41. An electromagnet 49 is connected to pawl 45, and is energized to move lip 43 into the path of stop lug 41 to provide a stop for flange 38 when photocell Z only is subjected to radiation. A plate 44 secured to lens barrel 20 by an arm 51 is supported by fixed pins 46 extending through slots 48 in the plate. The projection lenses 18,24 may be manually adjusted by a manual control which adjusts the focus of the projected image on a screen by a rack 50 on the lower edge of plate 44 engageable with a pinion 52 manually rotatable by a knob 54. The plate 44 supports stop arms 56, 58 having end portions pivotally mounted to fixed supports 60, 62 respectively, and other portions thereof connected to plate 44 by pin and slot connections 64, 66. The intermediate portion of arm 58 is engageable by a pin 68 of flange 38 to provide a stop for the flange, and one end of arm 56 forms a stop for a lug 70 at one end of flange 38 which is urged against arm 56 by a spring 72. The length of the arms 56, 58 from their pivot points to the points of engagement with flange 38 are properly selected so that percentage change in the position of stop members 56, 70 properly adjusts the stop positions established by arm 58, pin 68 and lug 41, lip 43 so that any size film being projected will be in focus. Since most of the slide mounts used for projection purposes contain 35 mm. film, to place the projected film image in focus (designated M in FIG. 1) the operator will initially adjust the position of the projector to obtain a maximum illuminated viewing area on the screen, and will then manually adjust the projection lens to focus the projected image on the screen. During such projection of 35mm film as seen in FIG. 4, radiation would be received by photocells X and Z and hence no output would be generated by the logic circuit. Accordingly, solenoid 40, 49 would not be energized and lug 70 of flange 38 remains in engagement with arm 56 by virtue of spring 72.

In the event a film mount is inserted in the film gate having a film area that is somewhere between the film area of a 35 mm. film such as M and the film area designated K, such as a film designated L in FIGS. 1 and 5, radiation from illumination source 8 would be received only by photocell Z, the radiation to the remaining photocells X and Y being blocked by the opaque film mount material. The amplified output signal from photocell Z is fed into logic circuit 36, the output thereof simultaneously energizing solenoid 40 and electromagnet 49 for moving lip 43 of pawl 45 into the path of stop lug 41 on flange 38. Accordingly, solenoid 40 moves the zoom lens 24 and flange 38 until lug 41 engages lip 43, and holds lens 24 in this position as long as the slide mount remains in the projection gate. Movement of zoom lens 24 causes film area L to be projected on the screen with the film image in focus and magnified such that the illumination viewing area on the screen is substantially equal to the illuminated viewing area for a 35 mm. film.

In the event a film mount is moved into the projection gate having a film size considerably smaller than film M such as film size designated K in FIGS. 1 and 6, all of the radiation to photocells X, Y and Z is blocked by the film mount material and no radiation is received by the photocells. As a consequence, an output is generated by logic circuit 36 which energizes solenoid 40 causing flange 38 and projection zoom lens 24 to be moved to the left as seen in FIG. 6 until stop pin 68 engages arm 58. Accordingly, in this stopped position, the film image will be in focus on the screen and will be magnified by zoom lens 24 so that the new illuminated viewing area on the screen for the smaller projected film area will be equal to the illuminated viewing area for film M.

Although in the projector described, it is the film mount material 14 that serves as a mask for blocking off the radiation to one or more of the photocells X, Y and Z, it is possible that other means such as masking blades may be used for this purpose, particularly for film strip projectors which do not utilize a film mount. In such projectors, a notch or mask on the film may be sensed by a sensing mechanism, and the sensing mechanism in response to such sensing may actuate one or more masking blades for blocking off the radiation to one or more of the photocells. In addition, masking mount material 14 or blades may be designed to control the light to the photocells in a different sequence or manner from that disclosed in the drawings, and in such event the logic circuit would have to be selected to receive this information and generate outputs for operating the solenoid 40 and electromagnet 49 in a proper way to achieve the desired result.

A power source is connected to the amplifiers 30, 32 and 34 and logic circuit 36 of the sensing and adjusting means through a normally open switch 74 in the film gate mechanism. When a film mount 14 is placed in the film gate in a projecting position, it engages and closes switch 74. Any other suitable means such as a manually operated switch may be used to connect the power source to the sensing and adjusting means.

The invention has been described in detail with particular reference to a preferred embodiment thereof, but it will be understood that variations and modifications can be effected within the spirit and scope of the invention as described hereinabove.

I claim:

1. In a projector having an optical axis, a projection station along the axis for selectively receiving at least two different films having light transmitting areas of different sizes, means for illuminating the light transmitting area of a received film, and optical projection means including a zoom lens movable along the optic axis for forming a predetermined sized image of the light transmitting area of a received film at a remote plane, the combination comprising:

electrical means for (1) sensing the relative size of the light transmitting area of a film received at the projection station and (2) producing an electrical signal having a changeable characteristic indicative of the size of the light transmitting area of the received film; and drive means responsive to said electrical signal for moving the zoom lens along the optic axis in such a manner that the size of the projected image formed at the remote plane when said electrical means senses a light transmitting film area of one size will be substantially the same as the size of the projected image formed at the remote plane when said electrical means senses a light transmitting film area of a different size.

2. In a projector having an optical axis, a projection station along the axis for selectively receiving at least two different films having light transmitting areas of different sizes, means for illuminating the light transmitting area of a received film, and an optical projection means including a zoom lens, the combination comprising:

electrical means for (1) sensing the relative size of the light transmitting area of a film received at the projection station, and (2) producing an electrical signal having a changeable characteristic indicative of the size of the light transmitting area of the received film;

drive means responsive to said electrical signal for moving zoom lens along the optic axis in a first direction to enlarge the size of the image at the remote plane of the light transmitting area of a received film;

spring means for urging the zoom lens in a direction opposite to said first direction; and means responsive to said electrical signal for controlling said drive means in such a manner that the size of the projected image at the remote plane of the light transmitting film area of one size will be substantially the same as the size of the projected image at the remote plane of the light transmitting film area of a different size.

3. The combination as defined in claim 2 wherein said controlling means comprises:

a stop member;

a first solenoid drivingly connected to said zoom lens and responsive to said electrical signal having a predetermined characteristic for moving the said zoom lens in said first direction toward said stop member; and arresting means selectively responsive to said electrical signal for arresting movement of said zoom lens before said zoom lens engages said stop member.

4. The combination as defined in claim 3 wherein said arresting means comprises:

a stop lug on said zoom lens;

a pawl movable into and out of the path of said stop lug; and a second solenoid adapted when energized by said sensing means to move said pawl into the path of said stop lug.

5. The combination as defined in claim 1 wherein said electrical means comprises a plurality of photocells responsive to illumination transmitted through the light transmitting area of a received film to provide a signal varying in relation to the size of the light transmitting area.

6. The combination as defined in claim 2 wherein said electrical means comprises:

a plurality of photocells responsive to illumination transmitted through the light transmitting area of a received film to provide a signal varying in relation to the size of said area; and a logic circuit responsive to said signal to provide an electrical output to said control means.

7. The combination as defined in claim 6 wherein said controlling means comprises a first solenoid connected to said zoom lens and selectively responsive to said output of said logic circuit.

8. The combination as defined in claim 6 wherein said controlling means comprises:

a stop member;

a first solenoid connected to said zoom lens and selectively responsive to said output of said output of said logic circuit for moving said zoom lens into engagement with said stop member; and arresting means selectively responsive to said output of said logic circuit for arresting movement of said zoom lens before said zoom lens engages said stop member.

9. The combination as defined in claim 8 wherein said arresting means comprises:

a stop lug on said zoom lens;

a pawl movable into and out of the path of said stop lug; and a second solenoid adapted when energized by the output of said logic circuit to move said pawl into the path of said stop lug.

* * * * *